United States Patent
Ashpes et al.

[11] Patent Number: 5,990,423
[45] Date of Patent: Nov. 23, 1999

[54] MOBILE HOSPITAL BED SCALE

[75] Inventors: Adam T. Ashpes; Richard Rynd, both of Baltimore, Md.

[73] Assignee: EZE Weigh, LLC, Owings Mills, Md.

[21] Appl. No.: 09/097,128

[22] Filed: Jun. 12, 1998

Related U.S. Application Data

[60] Provisional application No. 60/086,999, May 28, 1998.

[51] Int. Cl.[6] ............................. G01G 19/08; G01G 19/10
[52] U.S. Cl. ........................... 177/140; 177/141; 177/144; 177/146; 254/2 C
[58] Field of Search ..................................... 177/144, 146, 177/126, 129, 130, 131, 140, 141; 254/2 C, 93 R, 89 H

[56] References Cited

U.S. PATENT DOCUMENTS

| | | | |
|---|---|---|---|
| 3,217,818 | 11/1965 | Engelsher et al. | 177/144 |
| 3,431,992 | 3/1969 | Whitecar | 177/140 |
| 4,002,215 | 1/1977 | Harvill | 177/130 |
| 4,006,789 | 2/1977 | Stultz et al. | 177/126 |
| 4,281,730 | 8/1981 | Swersey et al. | 177/126 |
| 4,403,680 | 9/1983 | Hillesheimer | 177/146 |
| 4,487,276 | 12/1984 | Swersey et al. | 177/126 |
| 4,589,989 | 5/1986 | Müller et al. | 252/8.75 |
| 4,669,136 | 6/1987 | Waters et al. | 177/144 |
| 4,793,428 | 12/1988 | Swersey | 177/144 |
| 4,961,470 | 10/1990 | Koerber, Sr. | 177/144 |
| 4,974,692 | 12/1990 | Carruth | 177/144 |
| 5,173,977 | 12/1992 | Carruth et al. | 177/144 |
| 5,319,817 | 6/1994 | Hay et al. | 177/144 |
| 5,393,935 | 2/1995 | Hasty et al. | 177/45 |
| 5,393,938 | 2/1995 | Bumbalough | 177/144 |
| 5,612,515 | 3/1997 | Eisen | 177/126 |
| 5,672,849 | 9/1997 | Foster et al. | 177/263 |
| 5,739,478 | 4/1998 | Zefra | 177/130 |
| 5,747,745 | 5/1998 | Neuman | 177/132 |

*Primary Examiner*—Randy W. Gibson
*Attorney, Agent, or Firm*—Daneker, McIntire, Schumm et al; Brooke Schumm, III

[57] ABSTRACT

A mobile bed scale is contemplated which lifts the entire bed with patient in situ on a load platform with a non-slip surface. The scale minimizes both vertical and horizontal displacement. The platform has load cells which deliver data to a memory and display device. The invention is portable and partly foldable to aid in storage. It provides for recharging if desired, and for use of an auxiliary power source if desired.

64 Claims, 11 Drawing Sheets

FIG.1

FIG. 3B
SPRUNG WHEELS

FIG. 3C
LOCKING WHEELS

FIG. 3A
LOWERING WHEELS
TO HANDLE ATTACHMENT

PLATFORM IN LOWERED POSITION WITH WHEELS LOWERED (FROM REAR)

FIG. 7

PLATFORM IN RAISED POSITION WITH FLOOR GRIPPING PLUNGERS EXTENDED (FROM REAR)

FIG.11 PLATFORM AND FOLDING HANDLE IN LOWERED POSITION WITH FLOOR GRIPPING PLUNGERS RETRACTED (FROM SIDE)

MOBILE HOSPITAL BED SCALE

CROSS-REFERENCES

This application is a continuation-in-part of a provisional application by the same name A MOBILE HOSPITAL BED SCALE filed on May 28, 1998 invented by Adam T. Ashpes and Richard Rynd to which Ser. No. 60/086999 has been assigned.

BACKGROUND

1. Field of the Invention

The invention is a mobile hospital bed scale which slides under a hospital or nursing bed, with patient in situ. With a minimum of disturbance of the patient, a person operated the mobile hospital bed scale to lift the entire bed slightly, with patient in place, as opposed to lifting the patient apart from the bed, and as opposed to implanting the scale in the bed. The mobile hospital bed scale is used to determine the weight of bed and patient. If a memory device is programmed with the tare weight of the bed, the patient's weight can be determined, or stored for future recall and reference. The mobile hospital bed scale is portable and can be moved from bed to bed.

2. Description of Related Art

Weighing bedridden hospital patients is a time consuming and unpleasant task. An obvious and unpleasant way to weigh patients is to put a sling underneath them, and hoist them by a spring scale. This disturbs the patient. Foster et al, U.S. Pat. No. 5,672,849 is a variation on this theme and contemplates building the bed with a patient support built on a frame that can be raised and lowered on the bed. This requires the adaptation of all hospital beds to this scale, which is expensive. The present invention avoids that bed-by-bed expense and the disturbance of the patient.

In Stultz et al, U.S. Pat. No. 4,006,789, the inventor proposes to slide a horizontal table under the patient and then weigh the patient. The necessary tipping or related movement of the patient to get the scale underneath the patient is sometimes referred to as "log-rolling." Not only does the invention disturb the patient, but the invention is somewhat bulky and takes up more storage space than the present invention. Swersey et al, U.S. Pat. No. 4,487,276, Dec. 11, 1984 attempts to eliminate some of the bulk by having a tip-up platform, but still requires sliding a horizontal table under the patient to weigh the patient. Hay et al, U.S. Pat. No. 5,319,817 Jun. 14, 1994 also contemplates a tip-up, fold-up horizontal platform slid under the patient. Both the sling and the horizontal table inventions require substantial movement of the patient. Such movement is one of the largest sources of disability injury to employees of ambulatory care facilities. Other patents such as Eisen, U.S. Pat. No. 5,612,515, Mar. 18, 1997, are of the same genre.

Swersey, U.S. Pat. No. 4,793,428, Dec. 27, 1988, is entitled "Hospital Bed with an Integrated Scale." As the name suggests the scale is in the bed. Weighing patients is very important and needs to be done for bedridden patients approximately once per day. The expense of equipping an entire ambulatory facility with such beds and bed scales is substantial. That expense for multiple beds is eliminated by the present invention.

Stith et al, U.S. Pat. No. 4,589,989, Apr. 29, 1986 contemplates a scale mounted on and in a bed frame. The invention appears intended for acute care. Koerber, Sr., U.S. Pat. No. 4,961,470, Oct. 9, 1990 also contemplates a weighing mechanism as part of the bed. The Stith and Koerber inventions are not practical for large multiple bed facilities because, again, weighing patients is very important and needs to be done for bedridden patients approximately once per day. The expense of equipping an entire ambulatory facility with such beds and bed scales is substantial. That expense for multiple beds is eliminated by the present invention. Other patents such as Bumbalough, U.S. Pat. No. 5,393,938 are of the same genre.

Carruth et al, U.S. Pat. No. 4,974,692, Dec. 4, 1990 contemplated a weigh bed with two frames, but contemplates that there will be a weigh frame associated with each bed. The frame is not adapted to be used with multiple types of beds. Carruth et al, U.S. Pat. No. 5,173,977, Dec. 29, 1992 also contemplated using a load cell, but not in a combination as facile or designed like the present invention.

Hasty et al, U.S. Pat. No. 5,393,935 takes a different approach by having multiple slats slid under a mattress with load cells on each end. It still requires patient movement and does not appear to contemplate a memory device for the tare weight of the mattress or for the patient weight.

Waters et al, U.S. Pat. No. 4,669,136 falls in the same genre as the Stith invention as an in-bed weighing device.

Swersey et al, U.S. Pat. No. 4,281,730, has an "under bed" scale which achieves many of the patient care objects of this invention and relieves a source of disability injury. However, that bed scale requires a pair of scales onto which the bed is rolled.

The present invention eliminates any patient movement with respect to the bed. The present invention only requires a small vertical movement of the bed on the platform sufficient to allow the platform to bear the weight of the patient and bed, which can be two inches of vertical lift of the bed or less. The platform is preferably designed with a non-skid surface to promote safety and stability.

Previous to this particular invention, the inventors had developed an initial model of the invention to review its potential attributes and experiment with it. That model was very simply a motorcycle lift with a platform with load cells placed on it. The motorcycle lift had a pivot mechanism with some horizontal displacement as the platform was raised. That model had to be dragged into position. That model utilized a plug-in power source for a lifting mechanism for a hospital bed which raised issues of electrical discharge in an environment where patients might be on oxygen. The model required a user to stoop, and therefore was not ergonomically efficient for use. The model of the invention took too much personnel time to raise the bed. The model required a reset of tare weight for each weighing. Use of the model was abandoned. Thereafter, this invention was designed which achieves the objects set forth in the objects of the invention.

OBJECTS OF THE INVENTION

An object of the invention is to enable the tare weight of a bed to be easily ascertained, recorded, and retained.

An object of the invention is to enable a slight person to easily maneuver the invention under a hospital bed and to use it.

An object of the invention is to avoid the necessity of an independent power source or plug-in power source and to enable a human to power the lifting mechanism.

An object of the invention is to create a weighing system or bed scale that can be used with various models of beds.

An object of the invention is to have the bed scale gripping the floor as the scale is operated.

An object of the invention is to have a memory storage device to store multiple tare weights of beds and multiple weighings so that data can be easily batch-transferred to patient records after an employee has done, for instance, a "row" of beds or rooms.

DESCRIPTION OF THE INVENTION

Figure 5:
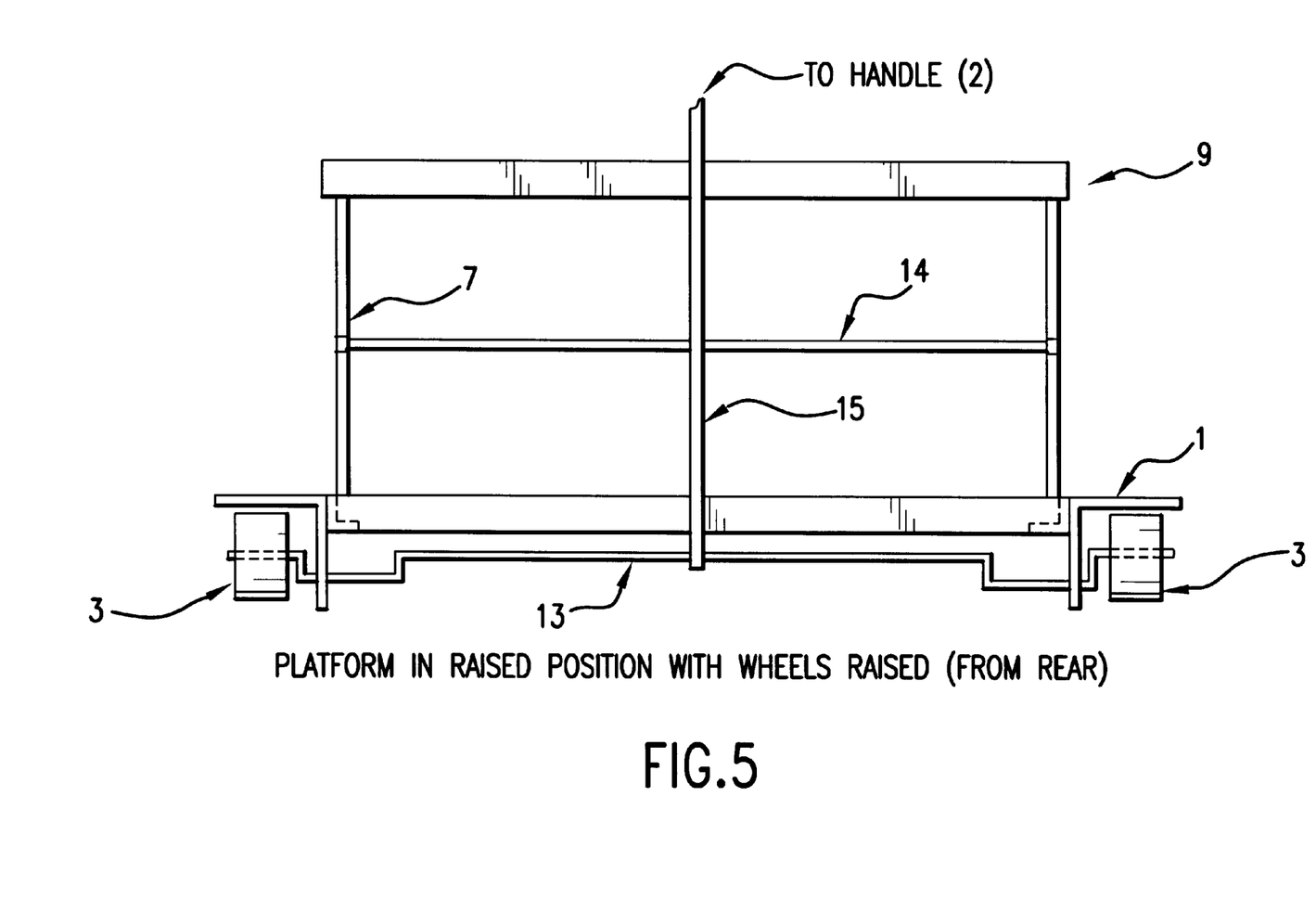
FIG. 5 shows an end view with an offset axle mechanism used to secure the mobile bed scale from moving.
Figure 6:
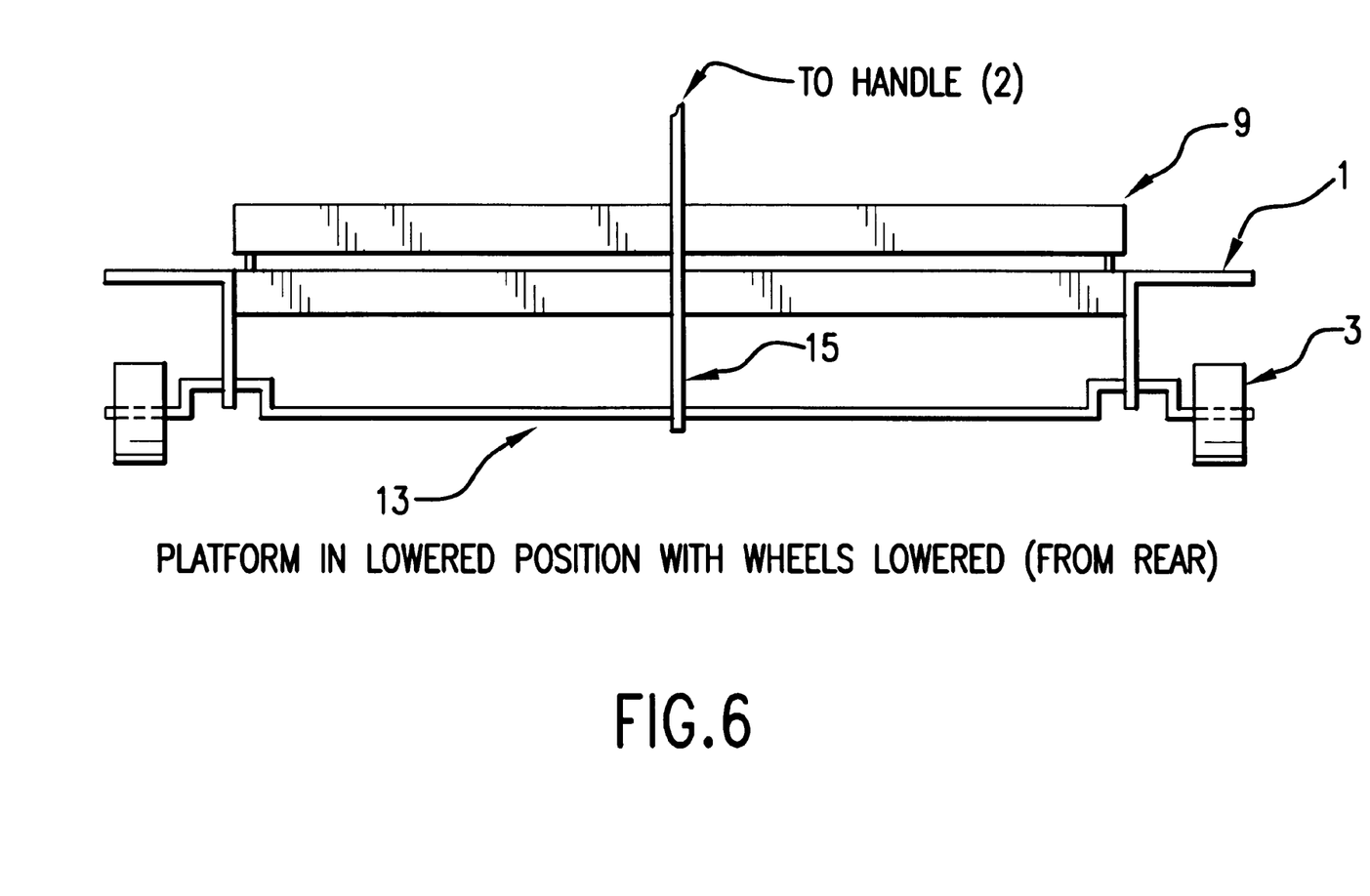
FIG. 6 shows an end view with an offset axle mechanism in a position with the wheels lowered for movement of the scale.

The preferred design for the invention consists first of a mobile frame base (1). A handle (2) is designed so that when it is lowered to a position whereby the bed scale would be moved, either the set of wheels nearest the handle(3), or both sets of wheels (3) and (4), are also lowered, lifting the frame base (1) above the floor for easier movement. Steering wheels (4) are contemplated, in this version, mounted on the end of the scale away from the handle. The wheels farther away from the handle (4) may be fixed or mobile, but optimally should protrude slightly under the frame if they do not lower upon lowering of the handle. When the handle is lifted, at least one set of wheels needs to rise so that part of the frame rests on the floor to minimize lateral movement of the bed scale and the bed being lifted. An offset axle (13) in FIG. 5, and an offset axle tie rod (15) to a handle (2), are employed in combination so that when the handle is lifted the wheels are raised (so the mobile frame base rests on the floor) and when the handle is lowered the wheels are lowered (allowing the frame to roll).

Figure 7:
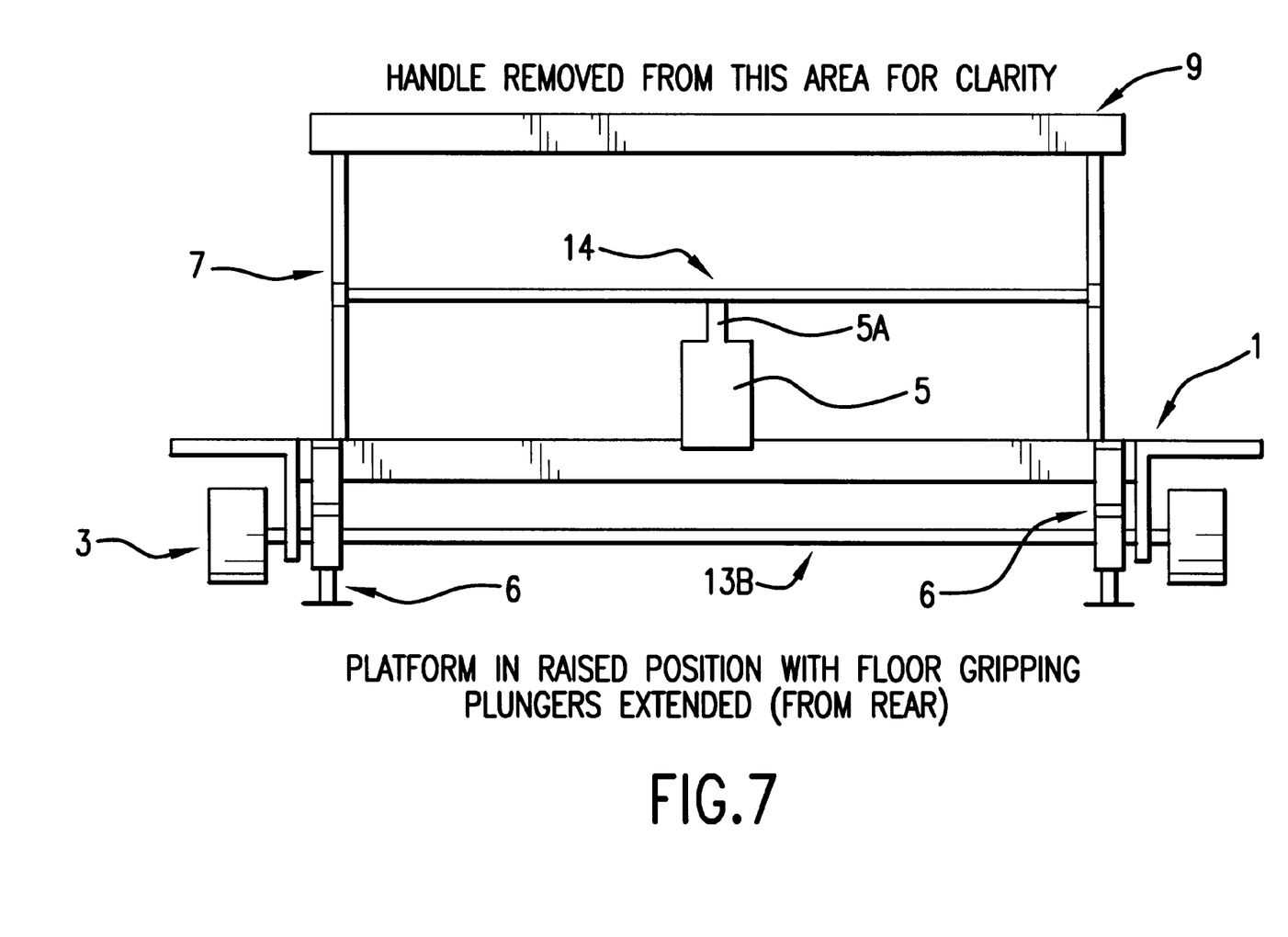
FIG. 7 shows an end view of the mobile bed scale with the handle removed for clarity with the platform in raised position and pop-down floor grips in the locked position.
Figure 8:
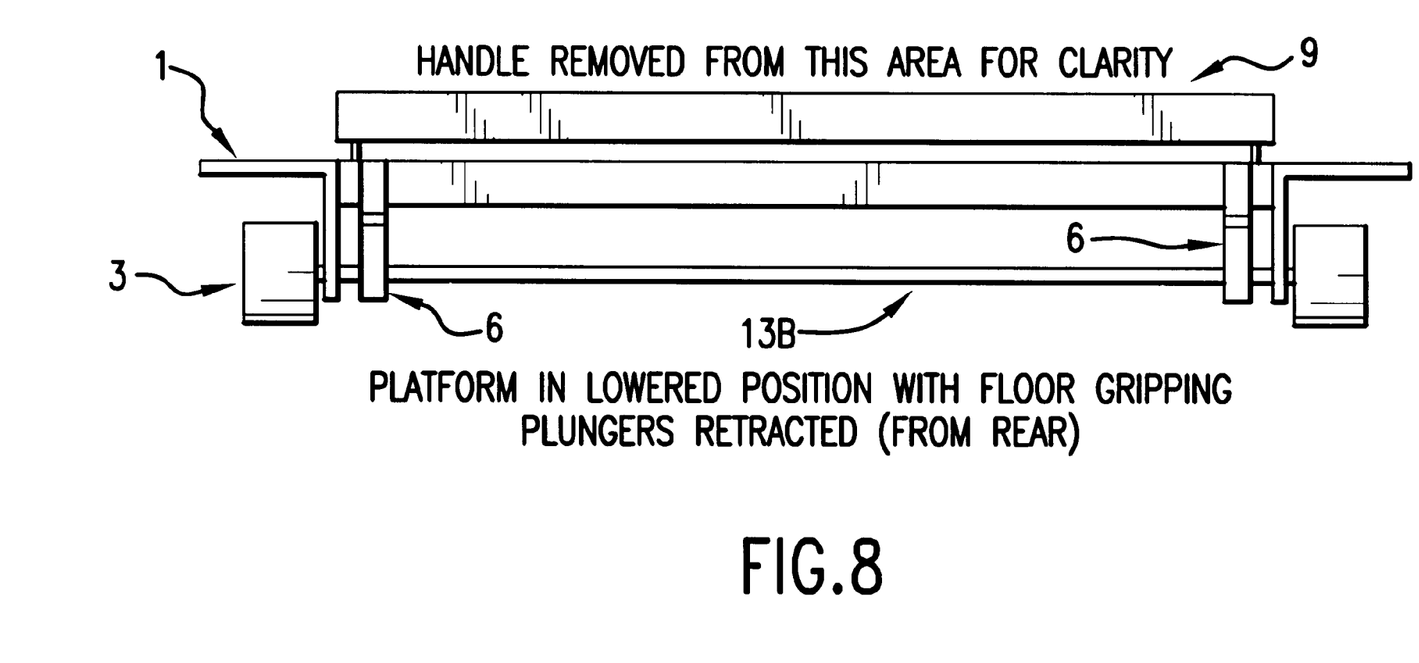
FIG. 8 shows an end view of the mobile bed scale with the handle removed for clarity with the platform in lowered position and pop-down floor grips in the unlocked position.
Figure 9:
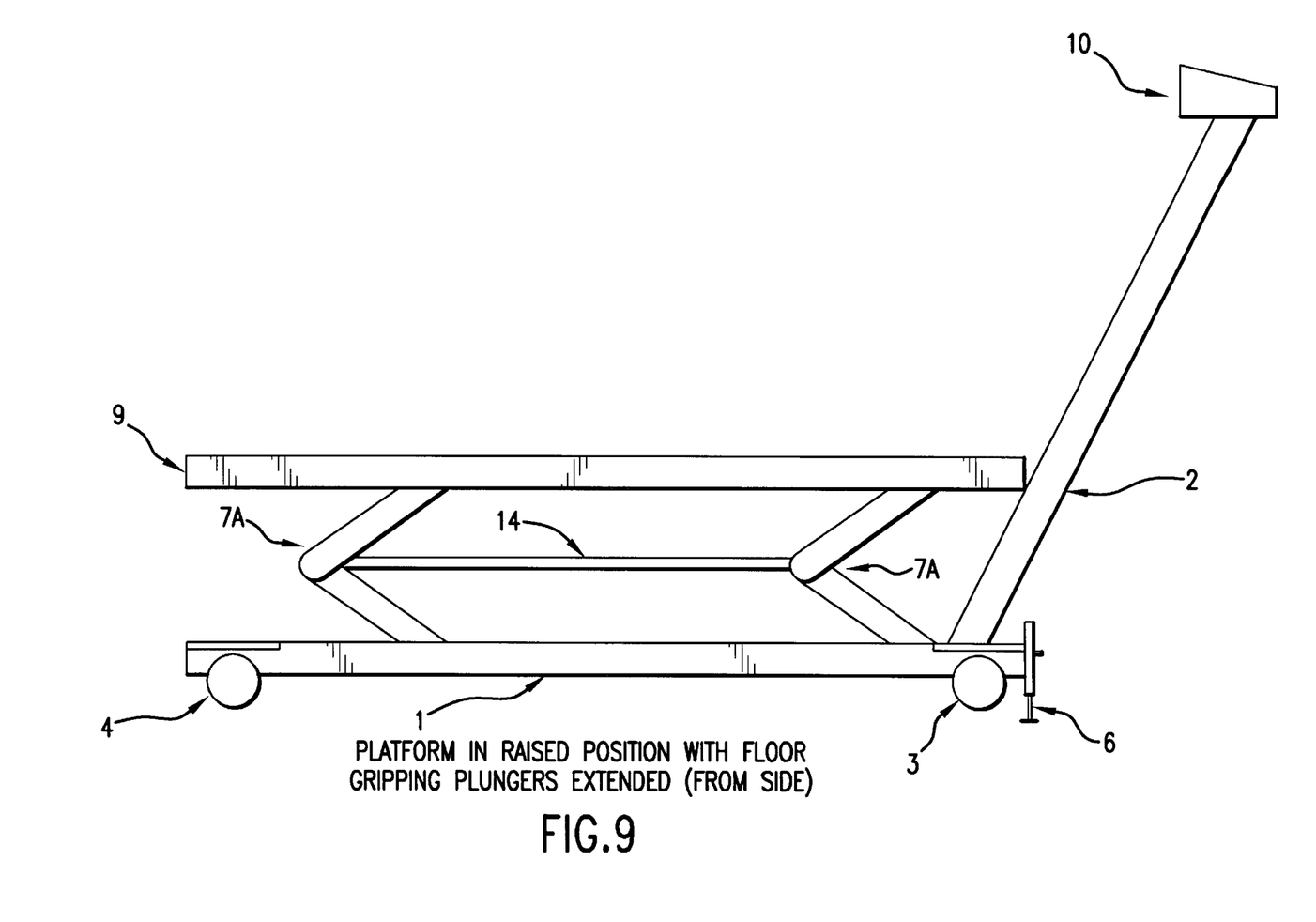
FIG. 9 shows a side view of the scale with the handle, the display and two parallel angled linkages/ The platform is in a raised position with pop-down floor grips in the locked position.

A more complex way to lock the frame to the floor is to use sprung wheels (3B). In this alternative, attached to the frame base proximate to the corners are sprung wheels mounted so that when weight is put on the frame, it presses down on the springs, so that the bottoms of the wheels are even with the bottom of the frame base which bears the weight of the bed being lifted and prevents the apparatus from rolling. This is referred to in this invention as the wheel-spring mechanism. Upon release of the weight of the bed, the wheels "pop down" and the invention can be rolled to the next bed. Because a certain amount of force is required to press the wheels down before the bed is lifted, the memory device recalling the tare weight must have the "press-down" tare weight also stored. Alternatively, locking wheels may be used that are heavier duty caster-type wheels (3C). Another alternative is to use floor gripping plungers or "pop-down floor grips" (6) such as one sees used to hold open doors. See FIG. 7. These are operated by pressing a toe on a piston held by sprung metal to lock the grip, and released by pressing a toe on the piston or the sprung metal depending on the design, and simply release the pressure on the wheels so the frame does not roll, which is shown in exaggerated fashion in FIG. 7. A continuous axle for better weight distribution may be used (13B). FIG. 8 shows the floor gripping plunger or "pop-down floor grip" in the upright mode allowing the mobile bed scale to roll. FIG. 9 shows the platform lowered, and the floor gripping plungers up and the scale ready-to-roll.

Figure 1:
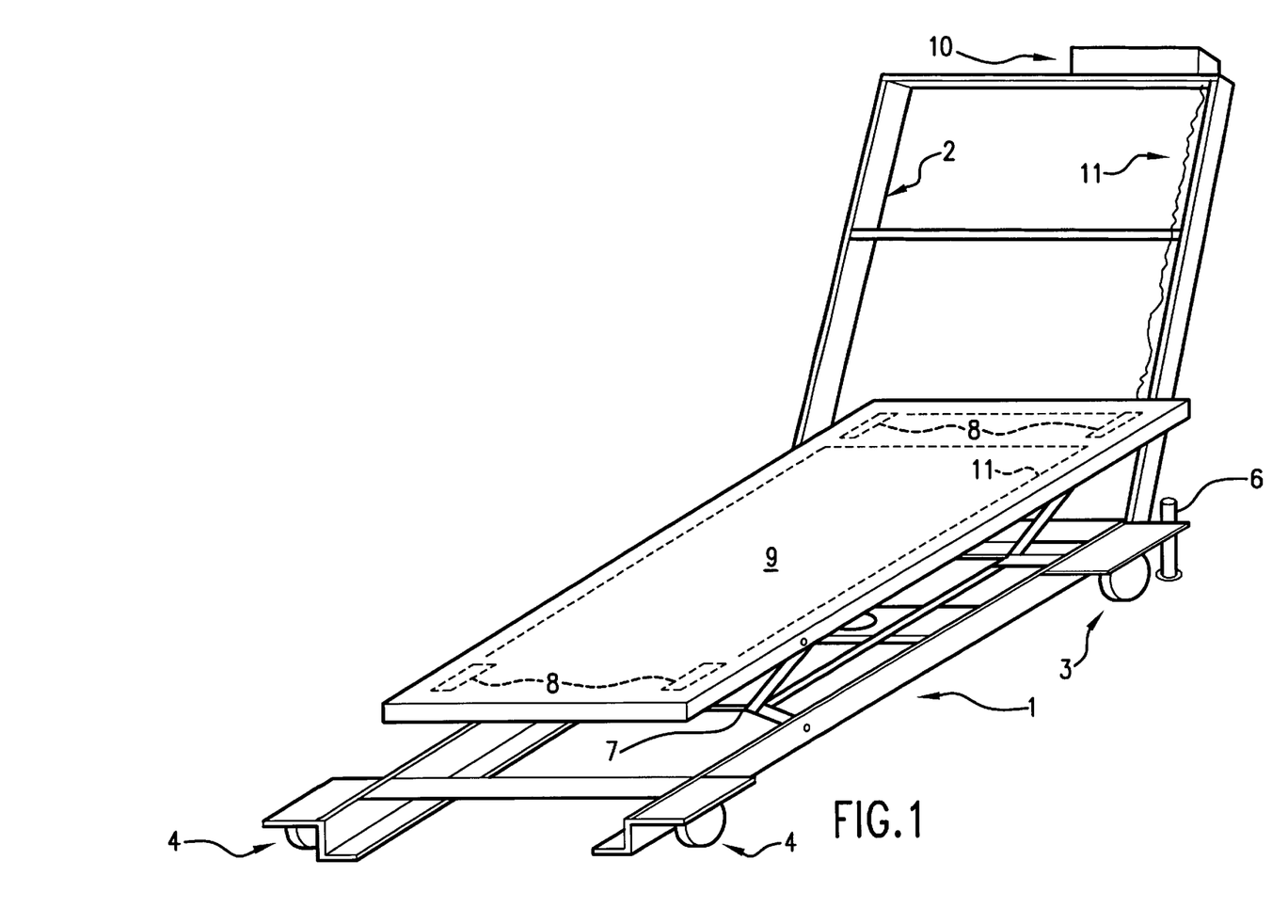
FIG. 1 illustrates the mobile bed scale with pop-down floor grips and the platform to support a hospital bed partially raised.

Mounted on the mobile frame base is a lifting apparatus (7). That lifting apparatus is preferably used to elevate a platform with load cells. The platform preferably has a non-slip coating or cover. The lifting mechanism is preferably a scissors mechanism, but could be a pivot mechanism or two parallel angled linkages on each side are linked at a center pivot point by a tie bar (7). See FIGS. 1 and 9. The two parallel angled linkages shown in FIG. 1 and FIG. 9 can be reversed so that the apex of the angle formed at the point indicated (7) faces the handle (2). If so reversed, much like a car jack, where upward pressure is generated by pulling threaded blocks together with a screw at the "bending elbows" of the car jack, in this invention, a piston is to be used to place pressure on the side of the scissors to create upward lift. Alternatively, a piston could be used to lift the platform directly and the scissors mechanism or the pivot mechanism could be used to stabilize the upward rise of the platform. The pivot mechanism (7B) of FIG. 2, and most other mechanical mechanisms, are either more complicated or have the disadvantage of producing at least slight horizontal movement of the bed being lifted, but are serviceable and covered by the claims herein. A lifting apparatus tie rod (14), perpendicular to the length of the mobile bed frame, may be used to tie the sides of the lifting or stabilizing mechanism together.

The platform (9) is equipped with load cells. The platform can be purchased "off-the-shelf" with the load cells (8). The load cells generate an electrical output transmitted through a data cable or wire harness (11) serving as a data transmission means to a display indicating the weight of the load on the platform.

Figure 10:
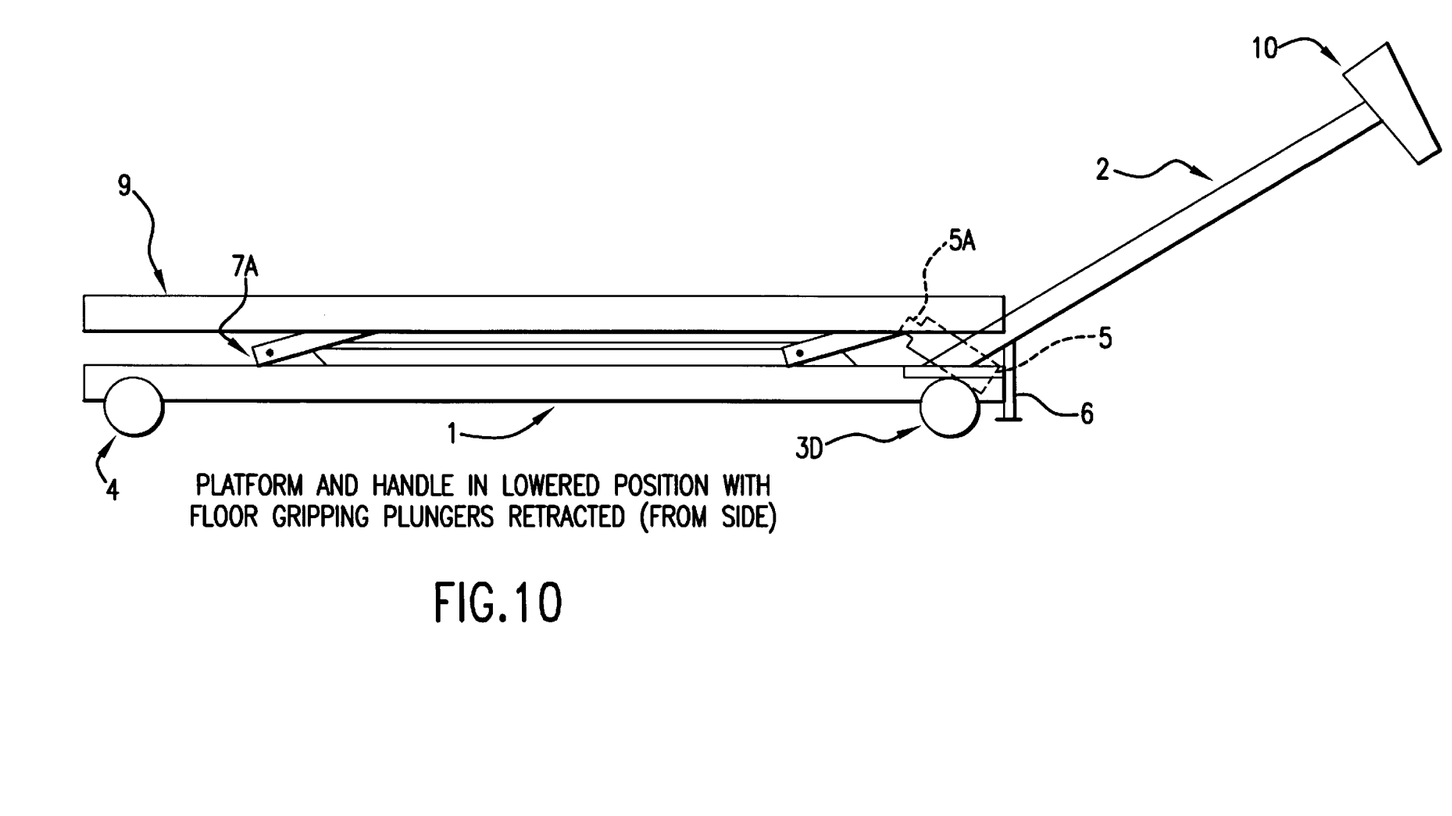
FIG. 10 shows FIG. 9 in the lowered position. The handle is shown as being maneuvered to be lowered even though pop-down floor grips are used.

The lifting is caused by a power source which is preferably a pump-driven piston (5). The body of the power source, preferably a pump, is indicated as (5) and the piston as (5A). The best sort of pump is one that does not require a bulky power source such as a battery, or that requires a plug inserted into an electrical outlet in the wall. A foot pump that uses a fluid to convey driving force, such as one that is either hydraulic or air driven, generates the requisite force on the piston (5A) to drive the lifting mechanism to lift the platform, or may be employed directly against the platform (FIG. 10). A foot pump for the power source may be permanently mounted on the frame, be "portable" and hung from the frame when not in use, or detached when the scale is not in active use. It should be recognized that it is not preferable to have any more lift of the bed than is necessary. Subject to the positioning of the bed on the platform, once the bed is lifted so its entire weight is on the platform, sufficient lift has been achieved. This may require as little as a fraction of an inch after sufficient pressure to lock the base frame to the floor has occurred if the wheel spring mechanism is used. If the wheel locks or the pop-down floor grips such as one uses for holding open doors are used, there will not only be little horizontal displacement, but also little vertical displacement of a patient bed.

Figure 2:
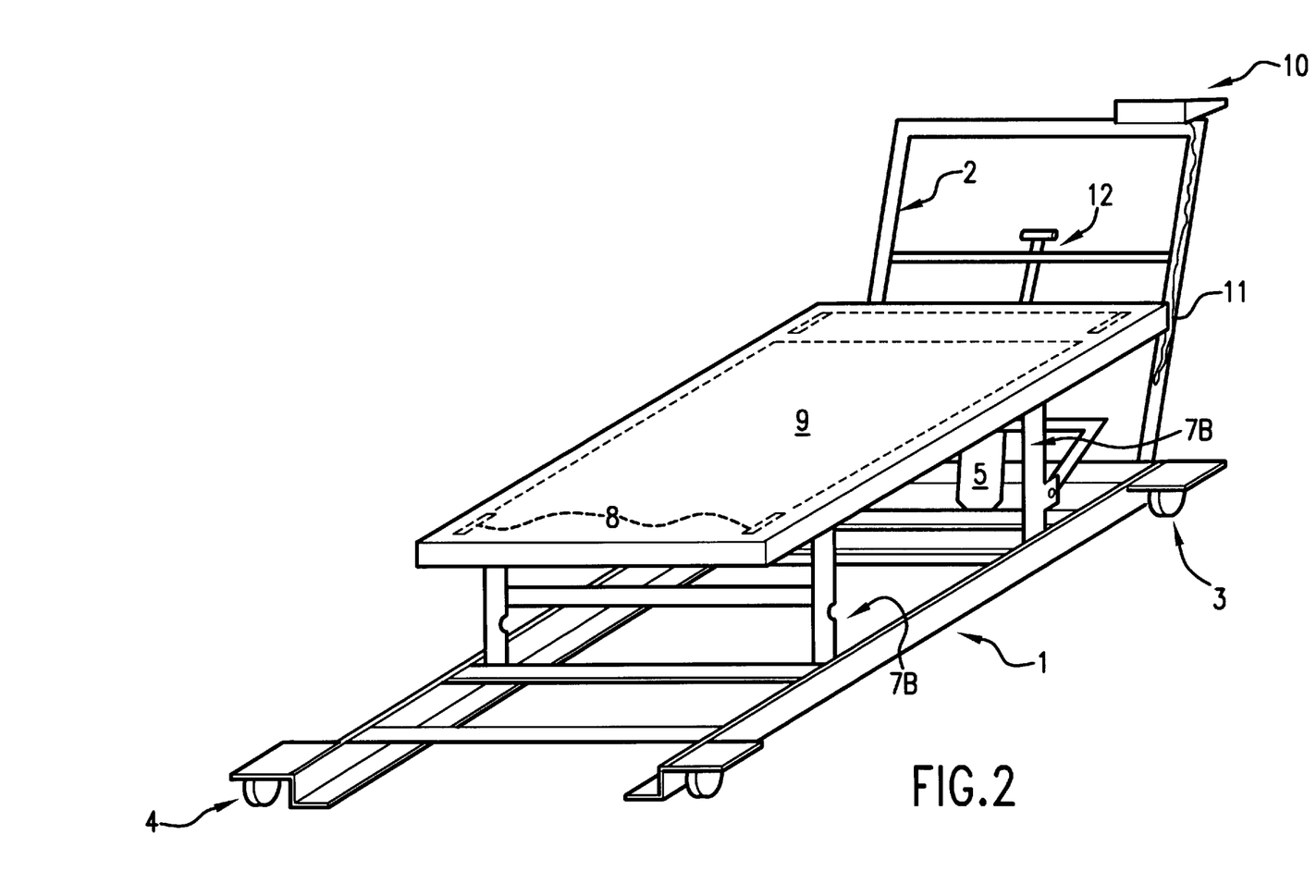
FIG. 2 illustrates the mobile bed scale with a pivot type mechanism and shows the power source for lifting, in this case a hydraulic ram. A release for the ram is shown.
Figure 3A:
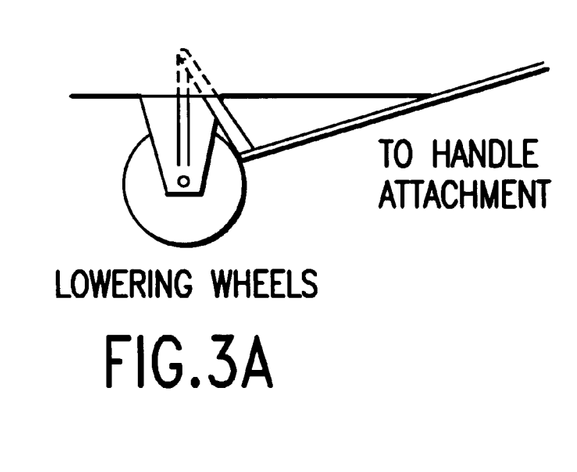
FIG. 3 shows various wheel locking arrangements.
Figure 3B:
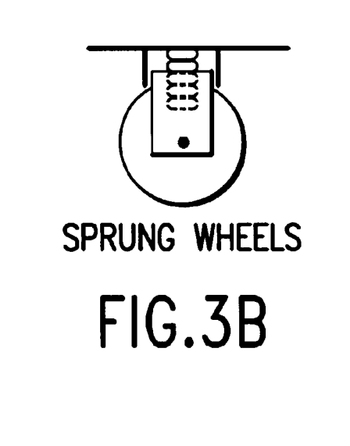
Figure 3C:
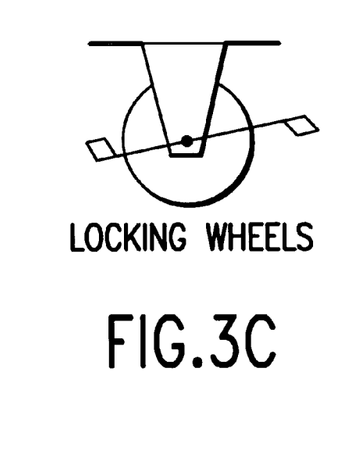

After the pump has been operated, the invention contemplates an easy hand-release (12) that does not require the operator to bend. A hand valve release (12) is sufficient, and can be integrated with a handle for moving the bed scale around a health care facility (FIG. 2).

Figure 4:
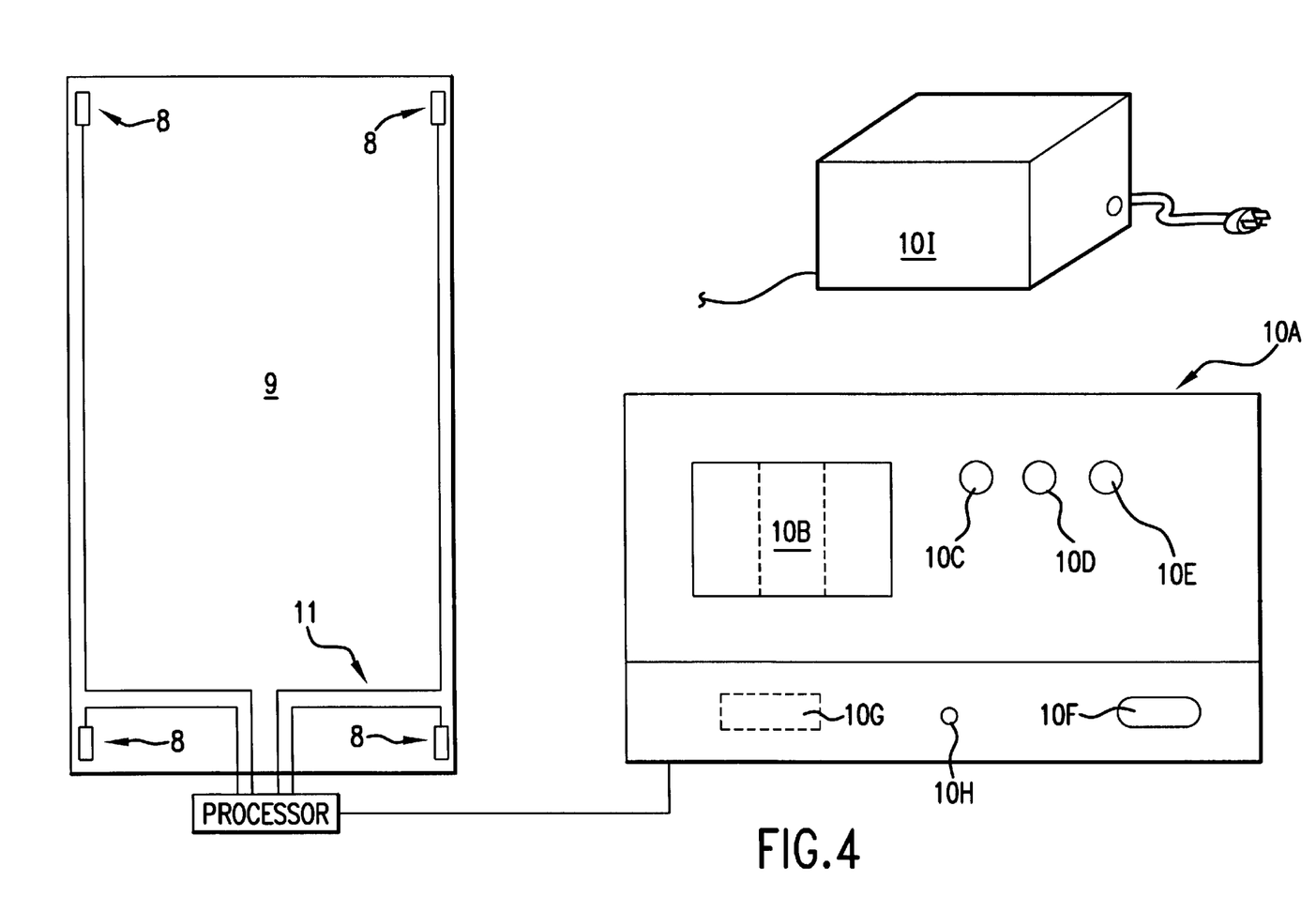
FIG. 4 shows a typical display box and the wiring from the load cells that sense the bed weight.

Mounted to the handle (2), for simplicity sake, is a small memory device which is programmed to store bed tare weights and patient weights for recall and input to patient charts (10A–10H). Normally the display device and memory device would be in the same "box" and would include not only the memory device (10A), but also an LCD display (10B), a tare weight input device (10C), an on-off switch (10D), a net/gross selector switch (10E), an RS-232 port (10F), a rechargeable battery (10G), a recharger port (10H), and may or may not include a portable recharger (10I), all of which are shown in FIG. 4. A practical sort of display device and platform scale adaptable to this invention are made by Arlyn Scales of Lynbrook, N.Y.

An electrically operated device is defined to include any electrically operated device having any requisite static discharge or spark arresting apparatus, and generally is intended to refer to a motor or electrically operated pump.

Figure 11:
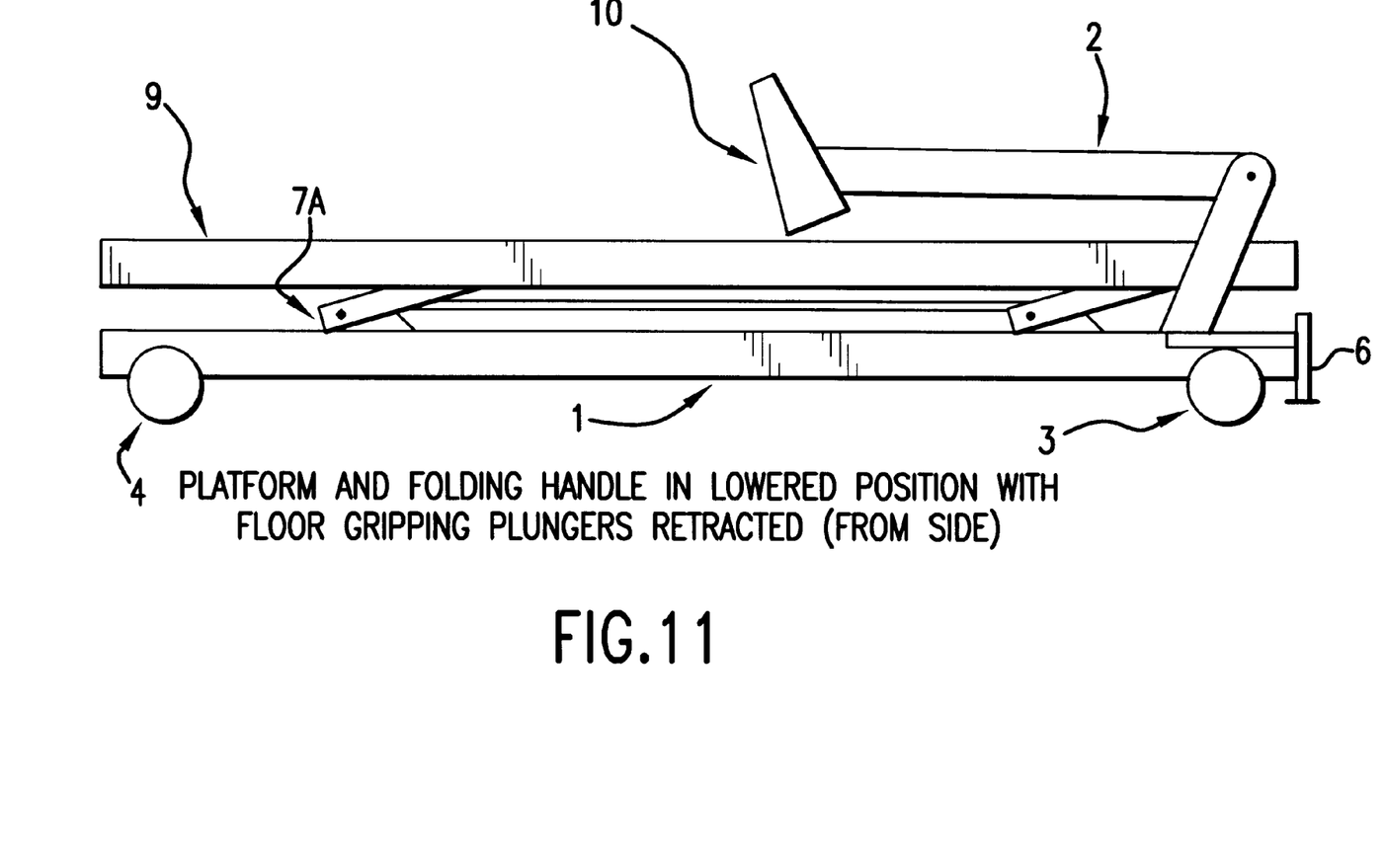
FIG. 11 shows a folding handle feature added to FIG. 9 with the scale in the lowered position ready to be moved and stored.

A folding handle may also be used as shown in FIG. 11. FIG. 11 is similar to FIG. 10 with the handle folded down and a handle pivot shown. FIG. 11 also shows steering wheels (4) at the end of the scale away form the handle.

The attachment means referenced in the claims may be a linkage bar to the end of the piston (5A) of the power source (5) opposite the mount of the power source. The power source (5) could be installed to apply pressure against the linkage bar and pull the lifting apparatus tie rod (14) as shown in FIG. 7.

The reference in this specification and claims to "horizontal bed support" is intended to include a platform or a framework that accomplishes the same function as a platform. The horizontal bed support in this invention is intended to stably support the hospital bed as the bed is lifted with the patient in situ. The reference in this specification and the claims to "piezoelectric sensors" in intended to include the class of the sensors emitting an electronic signal in proportion to weight referenced in the trade as load cells.

The embodiments represented herein are only a few of the many embodiments and modifications that a practitioner reasonably skilled in the art could make or use. The invention is not limited to these embodiments nor to the versions encompassed in the figures which are intended as an aid to understanding the invention and are not meant to limit the disclosure or the claims. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. A mobile bed scale comprising:

a mobile base frame moved on a floor;

a means for supporting a bed, to be slid under a hospital bed, said means being sufficiently large to stably support such a bed with minimal horizontal displacement of a hospital bed being lifted;

a lifting apparatus for elevating said means for support a bed with minimal horizontal displacement of a hospital bed being lifted;

said lifting apparatus for elevating said means for supporting a bed being mounted on said mobile base and being mounted generally beneath and adjacent to said means for supporting a bed;

said means for supporting a bed, said lifting apparatus, and said mobile base frame being sufficiently low above said planar surface on which frame is moved to be slid under a hospital bed;

a power source for causing said lifting apparatus to elevate said means for supporting a bed;

said power source being mounted on said mobile bed scale;

said power source being operable by a human without necessity of auxiliary power;

said power source for causing said lifting apparatus to elevate said means for supporting a bed and said means for supporting a bed being adjustably operable to a raised position by a human from a standing position;

said means for supporting a bed having a weight sensing means;

said weight sensing means being at least three piezoelectric sensors;

said weight sensing means being connected by a data transmission means to a display means and to a memory storage device;

said display means being mounted on said mobile base frame on an arm extending generally upwards from said mobile base frame to permit visual perception of said display means by a human in a standing position.

2. The mobile bed scale according to claim 1, further comprising:

said mobile base frame having wheels;

said power source being fluid-driven;

said data transmission means being a wire harness;

linkage between said wheels and said arm connected to said mobile base frame so that upon raising said arm, said mobile base frame is substantially in contact with said planar surface to stably support said hospital bed being lifted.

3. The mobile bed scale according to claim 2, further comprising:

said memory storage device storing at least one bed tare weight and at least one patient weight for recall and display on said display means.

4. The mobile bed scale according to claim 3, further comprising:

said means for supporting a bed having a non-slip surface at least where said means for supporting a bed contacts a hospital bed.

5. The mobile bed scale according to claim 4, further comprising:

a means of folding down said arm to facilitate storage.

6. The mobile bed scale according to claim 5, further comprising:

a recharging outlet.

7. The mobile bed scale according to claim 5, further comprising:
a recharger.

8. The mobile bed scale according to claim 5, further comprising:
said power source having electrically operated auxiliary power.

9. The mobile bed scale according to claim 1, further comprising:
said power source being fluid-driven;
said data transmission means being a wire harness; and
wheel-locking apparatus.

10. The mobile bed scale according to claim 9, further comprising:
said memory storage device storing at least one bed tare weight and at least one patient weight for recall and display on said display means.

11. The mobile bed scale according to claim 10, further comprising:
said means for supporting a bed having a non-slip surface at least where said means for supporting a bed contacts a hospital bed.

12. The mobile bed scale according to claim 11, further comprising:
a means of folding down said arm to facilitate storage.

13. The mobile bed scale according to claim 11, further comprising:
a recharging outlet.

14. The mobile bed scale according to claim 11, further comprising:
a recharger.

15. The mobile bed scale according to claim 11, further comprising:
said power source having electrically operated auxiliary power.

16. The mobile bed scale according to claim 1, further comprising:
said power source being fluid-driven;
said data transmission means being a wire harness;
at least one pop-down floor grip actuable and releaseable by foot action.

17. The mobile bed scale according to claim 16, further comprising:
said memory storage device storing at least one bed tare weight and at least one patient weight for recall and display on said display means.

18. The mobile bed scale according to claim 17, further comprising:
said means for supporting a bed having a non-slip surface at least where said means for supporting a bed contacts a hospital bed.

19. The mobile bed scale according to claim 18, further comprising:
a means of folding down said arm to facilitate storage.

20. The mobile bed scale according to claim 19, further comprising:
a recharging outlet.

21. The mobile bed scale according to claim 19, further comprising:
a recharger.

22. The mobile bed scale according to claim 19, further comprising:
said power source having electrically operated auxiliary power.

23. A mobile bed scale comprising:
a mobile base frame moved on a floor;
a horizontal bed support to be slid under a hospital bed sufficiently large to stably support such bed when such horizontal bed support is raised;
a lifting apparatus for elevating said horizontal bed support with minimal horizontal displacement of a hospital bed being lifted;
said lifting apparatus for elevating said horizontal bed support being mounted on said mobile base and being mounted generally beneath and adjacent to said horizontal bed support;
said horizontal bed support, said lifting apparatus, and said mobile base frame being sufficiently low above said planar surface on which said mobile base frame is moved to be slid under a hospital bed;
said lifting apparatus for elevating said horizontal bed support having a central lifting axis defined by a line perpendicular to said horizontal bed support, said line being located approximately centered on all moments of said horizontal bed support when a hospital bed is on said horizontal bed support;
a power source for causing said lifting apparatus to elevate said horizontal bed support situated laterally to said central lifting axis;
said power source being mounted on said mobile bed scale;
said power source being further operable by a human without necessity of auxiliary power;
said power source for causing said lifting apparatus to elevate said horizontal bed support, and said horizontal bed support, being adjustably operable to a raised position by a human from a standing position;
said horizontal bed support having a weight sensing means;
said weight sensing means being at least three piezoelectric sensors;
said weight sensing means being connected by a data transmission means to a display means and to a memory storage device;
said display means being mounted on said mobile base frame on an arm extending generally upwards from said mobile base frame to permit visual perception of said display means by a human in a standing position.

24. The mobile bed scale according to claim 23, further comprising:
said mobile base frame having wheels;
said power source being fluid-driven;
said data transmission means being a wire harness; and
linkage between said wheels and said arm connected to said mobile base frame so that upon raising said arm, said mobile base frame is substantially in contact with said planar surface to stably support said hospital bed being lifted.

25. The mobile bed scale according to claim 24, further comprising:
said memory storage device storing at least one bed tare weight and at least one patient weight for recall and display on said display means.

26. The mobile bed scale according to claim 25, further comprising:
a means of folding down said arm to facilitate storage.

27. The mobile bed scale according to claim 26, further comprising:
   a recharging outlet.
28. The mobile bed scale according to claim 26, further comprising:
   a recharger.
29. The mobile bed scale according to claim 26, further comprising:
   said power source being further operable by a human without necessity of auxiliary power.
30. The mobile bed scale according to claim 23, further comprising:
   said power source being fluid-driven;
   said data transmission means being a wire harness; and
   wheel-locking apparatus.
31. The mobile bed scale according to claim 30, further comprising:
   said memory storage device storing at least one bed tare weight and at least one patient weight for recall and display on said display means.
32. The mobile bed scale according to claim 31, further comprising:
   said horizontal bed support having a non-slip surface at least where said horizontal bed support contacts a hospital bed.
33. The mobile bed scale according to claim 32, further comprising:
   a means of folding down said arm to facilitate storage.
34. The mobile bed scale according to claim 33, further comprising:
   a recharging outlet.
35. The mobile bed scale according to claim 33, further comprising:
   a recharger.
36. The mobile bed scale according to claim 33, further comprising:
   said power source being further operable by a human without necessity of auxiliary power being.
37. The mobile bed scale according to claim 23, further comprising:
   said power source being fluid-driven;
   said data transmission means being a wire harness; and
   at least one pop-down floor grip actuable and releaseable by foot action.
38. The mobile bed scale according to claim 37, further comprising:
   said memory storage device storing at least one bed tare weight and at least one patient weight for recall and display on said display means.
39. The mobile bed scale according to claim 38, further comprising:
   said horizontal bed support having a non-slip surface at least where said horizontal bed support contacts a hospital bed.
40. The mobile bed scale according to claim 39, further comprising:
   a means of folding down said arm to facilitate storage.
41. The mobile bed scale according to claim 40, further comprising:
   a recharging outlet.
42. The mobile bed scale according to claim 40, further comprising:
   a recharger.
43. The mobile bed scale according to claim 40, further comprising:
   said power source being further operable by a human without necessity of auxiliary power.
44. A mobile bed scale comprising:
   a mobile base frame moved on a floor;
   a horizontal bed support to be slid under a hospital bed sufficiently large to stably support such bed when such horizontal bed support is raised;
   said horizontal bed support having a non-slip surface at least where said horizontal bed support contacts a hospital bed;
   lifting apparatus for elevating said horizontal bed support with no horizontal displacement of a hospital bed being lifted;
   said lifting apparatus for elevating said horizontal bed support being mounted on said mobile base and being mounted generally beneath and adjacent to said horizontal bed support;
   said lifting apparatus being a mechanical scissors lift;
   said horizontal bed support, said lifting apparatus, and said mobile base frame being sufficiently low above said planar surface on which said mobile base frame is moved to be slid under a hospital bed;
   a fluid-driven power source for causing said lifting apparatus to elevate said horizontal bed support;
   said power source being mounted on said mobile bed scale;
   said power source being further operable by a human without auxiliary power;
   said power source for causing said lifting apparatus to elevate said horizontal bed support, and said horizontal bed support, being adjustably operable to a raised position by a human from a standing position;
   said horizontal bed support having a weight sensing means;
   said weight sensing means being at least three piezoelectric sensors;
   said weight sensing means being connected by a wire harness to a display means and to a memory storage device;
   said display means being mounted on said mobile base frame on an arm extending generally upwards from said mobile base frame to permit visual perception of said display means by a human in a standing position;
   at least one pop-down floor grip to prevent said mobile bed scale from moving during patient weighing, which grip is actuable and releaseable by foot action;
   said memory storage device storing at least one bed tare weight and at least one patient weight for recall and display on said display means.
45. The mobile bed scale according to claim 43, further comprising:
   a means of folding down said arm to facilitate storage.
46. The mobile bed scale according to claim 44, further comprising:
   a recharging outlet.
47. The mobile bed scale according to claim 45, further comprising:
   a recharger.
48. A mobile bed scale comprising:
   a mobile base frame moved on a floor;
   a horizontal bed support to be slid under a hospital bed sufficiently large to stably support such bed when such horizontal bed support is raised;

said horizontal bed support having a non-slip surface at least where said horizontal bed support contacts a hospital bed;

lifting apparatus for elevating said horizontal bed support with no horizontal displacement of a hospital bed being lifted;

said lifting apparatus for elevating said horizontal bed support being mounted on said mobile base and being mounted generally beneath and adjacent to said horizontal bed support;

said lifting apparatus being a mechanical scissors lift;

said horizontal bed support, said lifting apparatus, and said mobile base frame being sufficiently low above said planar surface on which said mobile base frame is moved to be slid under a hospital bed;

a fluid-driven power source for causing said lifting apparatus to elevate said horizontal bed support;

said power source being mounted on said mobile bed scale;

said power source being further operable by a human without auxiliary power;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a wire harness to a display means and to a memory storage device;

said display means being mounted on said mobile base frame on an arm extending generally upwards from said mobile base frame to permit visual perception of said display means by a human in a standing position;

at least one wheel-locking apparatus to prevent said mobile bed scale from moving during patient weighing;

said memory storage device storing at least one bed tare weight and at least one patient weight for recall and display on said display means.

49. The mobile bed scale according to claim 47, further comprising:

a means of folding down said arm to facilitate storage.

50. The mobile bed scale according to claim 48, further comprising:

a recharging outlet.

51. The mobile bed scale according to claim 49, further comprising:

a recharger.

52. A mobile bed scale comprising:

a mobile base frame moved on a floor;

a horizontal bed support to be slid under a hospital bed sufficiently large to stably support such bed when such horizontal bed support is raised;

said horizontal bed support having a non-slip surface at least where said horizontal bed support contacts a hospital bed;

stabilization apparatus to minimize horizontal displacement of a hospital bed being lifted;

said stabilization apparatus being mounted on said mobile base and generally beneath and adjacent to said horizontal bed support;

said horizontal bed support, said stabilization apparatus, and said mobile base frame being sufficiently low above said planar surface on which said mobile base frame is moved to be slid under a hospital bed;

a fluid-driven power source for causing said lifting apparatus to elevate said horizontal bed support;

said power source being mounted on said mobile bed scale;

said power source being further operable by a human without auxiliary power;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors; said weight sensing means being connected by a wire harness to a display means and to a memory storage device;

said display means being mounted on said mobile base frame on an arm extending generally upwards from said mobile base frame to permit visual perception of said display means by a human in a standing position;

at least one wheel-locking apparatus to prevent said mobile bed scale from moving during patient weighing;

said memory storage device storing at least one bed tare weight and at least one patient weight for recall and display on said display means.

53. The mobile bed scale according to claim 52, further comprising:

a means of folding down said arm to facilitate storage.

54. The mobile bed scale according to claim 53, further comprising:

a recharging outlet.

55. The mobile bed scale according to claim 54, further comprising:

a recharger.

56. The mobile bed scale according to claim 52, further comprising:

said power source having a piston;

said stabilization apparatus having a lifting apparatus tie rod to synchronize said movement of said stabilization apparatus;

said piston having an attachment means from said piston to said lifting apparatus tie rod.

57. The mobile bed scale according to claim 56, further comprising:

said attachment means being a linkage bar.

58. The mobile bed scale according to claim 57, further comprising:

a means of folding down said arm to facilitate storage.

59. The mobile bed scale according to claim 58, further comprising:

a recharging outlet.

60. The mobile bed scale according to claim 59, further comprising:

a recharger.

61. A method of weighing a patient in situ comprising the following steps:

determining the tare weight of a hospital bed without a patient in said bed;

transmitting such tare weight to a memory storage device;

immobilizing a mobile bed scale;

weighing a patient by elevating a patient's entire hospital bed with the patient in situ by a mobile bed scale having a non-slip horizontally stable horizontal bed support, said mobile bed scale stably supporting said bed and containing load cells, said mobile bed scale having a fluid-driven power source for causing said lifting apparatus to elevate said horizontal bed support; said mobile bed scale having portably powered means of display and portably-powered memory storage device, said mobile bed scale having a data transmission means connected from said load cells to a memory storage and display device which reports and stores patient weight by automatically calculating the difference between weight measured by load cells and the tare weight of said hospital bed.

62. The method of weighing a patient in their hospital bed according to the method of claim 61 further comprising the following step:

connecting a recharger to said mobile hospital bed scale to recharge said portably powered means of display and said portably powered load cells.

63. A method of making a mobile hospital bed scale comprising the following steps:

assembling a lifting apparatus to a non-slip horizontal bed support having at least three piezoelectric sensors, said lifting apparatus being capable of being slid under a hospital bed, and being capable of lifting said hospital bed with minimal horizontal displacement;

assembling a mobile base frame to said lifting apparatus;

disposing a fluid-driven power source operable by a human without necessity of an auxiliary power source on said mobile base frame to cause said horizontal bed support to be elevated;

connecting a weight sensing means to a wire harness;

connecting said data transmission means to a display means and a memory storage device; and mounting said display means on an arm, said display means being perceptible to a standing human; and connecting said arm to said mobile bed scale.

64. The method of making a mobile hospital bed scale according to the method of claim 63, further comprising the following step:

connecting a recharger to said mobile hospital bed scale.

* * * * *